United States Patent
Kim et al.

(10) Patent No.: US 8,695,067 B2
(45) Date of Patent: Apr. 8, 2014

(54) METHOD TO AUTHENTICATE DEVICE AND SERVICE, AND SYSTEM THEREOF

(75) Inventors: Jin-hee Kim, Yongin-si (KR); Kyong-yong Yu, Seoul (KR); Moon Kyu Kim, Seoul (KR); Young-won Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 12/472,662

(22) Filed: May 27, 2009

(65) Prior Publication Data

US 2010/0031329 A1    Feb. 4, 2010

(30) Foreign Application Priority Data

Jul. 30, 2008    (KR) .................. 10-2008-0074797

(51) Int. Cl.
    *H04L 29/06* (2006.01)
(52) U.S. Cl.
    USPC .............. 726/5; 726/4; 726/6; 726/7; 726/26; 726/27

(58) Field of Classification Search
    USPC ............................................. 726/26–27, 4–7
    See application file for complete search history.

(56) References Cited

U.S. PATENT DOCUMENTS

| | | | |
|---|---|---|---|
| 2002/0026581 A1* | 2/2002 | Matsuyama et al. | 713/168 |
| 2003/0046541 A1* | 3/2003 | Gerdes et al. | 713/168 |
| 2003/0182551 A1* | 9/2003 | Frantz et al. | 713/170 |
| 2004/0083215 A1* | 4/2004 | de Jong | 707/7 |
| 2006/0123484 A1* | 6/2006 | Babic et al. | 726/26 |
| 2007/0206799 A1* | 9/2007 | Wingert et al. | 380/285 |
| 2008/0168568 A1* | 7/2008 | Brodersen et al. | 726/30 |
| 2009/0327702 A1* | 12/2009 | Schnell | 713/155 |
| 2010/0049540 A1* | 2/2010 | Shibasaki | 705/1.1 |

* cited by examiner

*Primary Examiner* — Chau Le
(74) *Attorney, Agent, or Firm* — Jefferson IP Law, LLP

(57) ABSTRACT

A method to authenticate a device and service, and a system thereof, the authentication method including: requesting device authentication information from a device provider in order to receive a service from a service provider, distinct from the device provider, and receiving the device authentication information from the device provider, the device authentication information being used by the service provider to authenticate the device. Therefore, it is possible to perform a device authentication process and service authentication process more simply.

20 Claims, 5 Drawing Sheets

METHOD TO AUTHENTICATE DEVICE AND SERVICE, AND SYSTEM THEREOF

CROSS-REFERENCE TO RELATED APPLICATION

This application claims the benefit of Korean Application No. 10-2008-0074797, filed Jul. 30, 2008 in the Korean Intellectual Property Office, the disclosure of which is incorporated herein by reference.

BACKGROUND OF THE INVENTION

1. Field of the Invention

Aspects of the present invention relate to an authentication method and a system thereof, and more particularly, to a method of authenticating a device and service, and a system thereof.

2. Description of the Related Art

Recent developments in Internet networking have enabled a large number of on-line services to be provided to consumers, such as bidding services provided through electronic commerce web sites and e-mailing services provided by Internet e-mail servers.

Generally consumers are to be authenticated to access the large number of on-line services provided by service providers. Specifically, if a consumer wants to receive a predetermined service, the consumer registers on an authentication system of a service provider that provides the predetermined service.

However, as the number of service providers has increased, a requirement to register on every authentication system of service providers has resulted in an inconvenience to consumers. Accordingly, it is difficult to provide consumers with a wide range of services.

Additionally, service providers want a large number of consumers to use their respective services, but such a troublesome authentication process obstructs consumers from using services. Therefore, the conventional authentication process is an obstacle to use services.

SUMMARY OF THE INVENTION

Aspects of the present invention provide a method to more easily perform a device authentication process and a service authentication process, and a system thereof.

According to an aspect of the present invention, there is provided an authentication method between a device and a service provider to provide a service to the device, the authentication method including: requesting, by the device, device authentication information from a device provider in order to receive the service from the service provider, different from the device provider; and receiving, by the device, the device authentication information from the device provider, wherein the device authentication information is used by the service provider to authenticate the device.

The requesting of the device authentication information may include transmitting, to the device provider, a message including information on a unique key of a device, information on an authentication process, and/or information on a time at which the device authentication information is requested.

The authentication method may further include: requesting, by the device, service authentication information from the service provider using the received device authentication information; and receiving the service authentication information from the service provider.

The service provider may be a plurality of service providers.

The device authentication information may include an identification (ID) and/or a password provided by the service provider for device authentication.

According to another aspect of the present invention, there is provided an authentication method of a device provider to authenticate an external device receiving a service from a service provider, the authentication method including: requesting, by the device provider, device authentication information from the service provider; receiving the device authentication information from the service provider; and transmitting the received device authentication information to the external device.

The requesting of the device authentication information may include transmitting, to the service provider, a message including information on a unique key of a device requesting the device authentication information from the service provider, information on an authentication process, and/or information on a time at which the device authentication information is requested.

The device authentication information may include an identification (ID) and/or a password provided by the service provider for device authentication.

The external device may be a plurality of external devices.

According to yet another aspect of the present invention, there is provided a device to perform authentication, the device including: a device authentication unit to request device authentication information from a device provider in order to receive a service from a service provider, different from the device provider, and to receive the device authentication information from the device provider; and a storage unit to store the received device authentication information.

The device authentication unit may transmit a message, to the device provider, including information on a unique key of the device, information on an authentication process, and/or information on a time at which the device authentication information is requested.

The device may further include a service authentication unit to request service authentication information from the service provider using the received device authentication information, and to receive the service authentication information from the service provider.

The service provider may be a plurality of service providers.

The service authentication unit may transmit a service authentication request message including the device authentication information and/or information on a unique key of the device.

The device authentication information may include an identification (ID) and/or a password provided by the service provider for device authentication.

According to still another aspect of the present invention, there is provided a device to authenticate an external device, the device including: an authentication unit to request device authentication information from a service provider and to receive the device authentication information from the service provider; and an authentication processing unit to transmit the received device authentication information to the external device.

The authentication unit may transmit a message, to the service provider, including information on a unique key of the device, information on an authentication process, and/or information on a time at which the device authentication information is requested.

The device authentication information may include an identification (ID) and/or a password provided by the service provider for device authentication.

The external device may be a plurality of external devices.

According to another aspect of the present invention, there is provided a device authentication method between a device and a service provider to provide a service to the device, the authentication method including: requesting, by a device provider, device authentication information from the service provider; transmitting, from the service provider to the device provider, the device authentication information; and transmitting, from the device provider to the device, the device authentication information, wherein the device authentication information is used by the service provider to authenticate the device.

According to another aspect of the present invention, there is provided an authentication system to provide a service, the system including: a device to request the service; a device provider to provide device authentication information to the device; and a service provider to service-authenticate the device using the device authentication information and to provide service authentication information to the device in response to the service-authenticating of the device, wherein: the device provider requests the device authentication information for the device from the service provider, receives the device authentication information from the service provider in response to the service provider device-authenticating the device, and provides the device authentication information to the device, and the device requests the service authentication information from the service provider by transmitting the provided device authentication information, and requests the service from the service provider using the provided service authentication information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
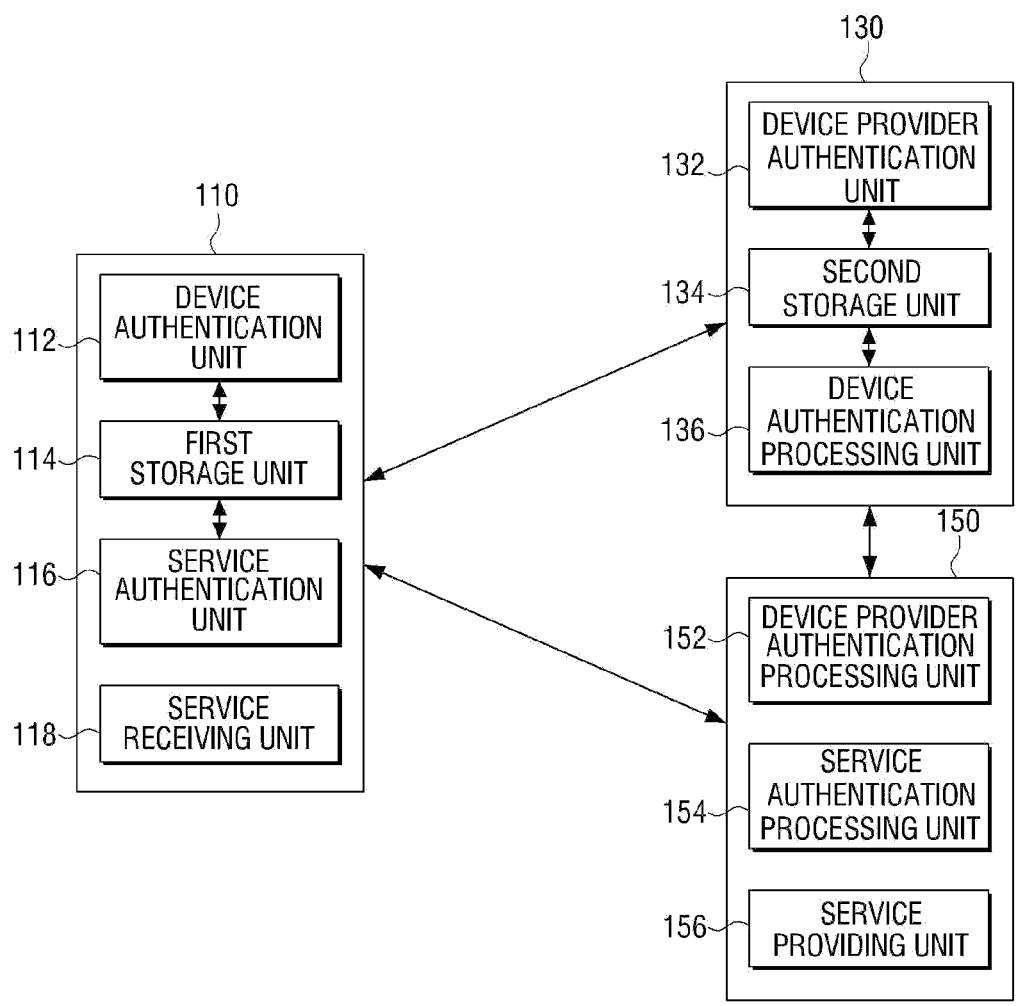
FIG. 1 is a block diagram of a system to perform authentication and provide services according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a system to perform authentication and provide services according to an embodiment of the present invention. Referring to FIG. 1, the system includes a device 110, a device provider 130, and a service provider 150.

The device 110 is provided with services from the service provider 150 via a network (such as the Internet). The device 110 includes a device authentication unit 112, a first storage unit 114, a service authentication unit 116, and a service receiving unit 118.

The device authentication unit 112 sends a device authentication request message (hereinafter, referred to as a "first authentication request message") to the device provider 130 in order to determine whether the device 110 is available. The first authentication request message may include information on a serial key of a device, information on device authentication to process a device authentication request, and/or information on a time at which device authentication is requested. As an example, the device authentication may be performed using Reliability, Availability, and Serviceability (RAS) or a keyed-hash message authentication code (HMAC).

Additionally, the device authentication unit 112 receives, from the device provider 130 a device authentication response message (hereinafter, referred to as a "first response message") corresponding to the first authentication request message. The first response message may be a success message indicating that authentication of the device 110 or a user thereof has succeeded or may be a failure message indicating that the authentication has failed. The success message may include device authentication information, and the failure message may include information on one or more reasons for the authentication failure. Furthermore, the device authentication information may include an identification (ID) and/or a password provided by the service provider 150. In response to the success message being received from the device provider 130, the device authentication unit 112 extracts the device authentication information from the success message and stores the extracted information in the first storage unit 114.

The service authentication unit 116 sends a service authentication request message including the device authentication information stored in the first storage unit 114 to the service provider 150. Accordingly, the service authentication unit 116 receives, from the service provider 150, a service authentication response message corresponding to the service authentication request message. The service authentication request message may include the device authentication information, information on service authentication to process a service authentication request, and/or information on a time at which service authentication is requested. The service authentication may be performed using RAS or HMAC in a similar manner as the device authentication described above.

The service receiving unit 118 requests a predetermined service from the service provider 150, and receives the predetermined service from the service provider in response to the request, so as to provide a user with the received service.

The device provider 130 provides the device 110, and may have information regarding devices the device provider 130 is able to provide, such as information regarding the device 110 (for example a serial key of the device 110). For example, the device provider 130 may be a computer or a server of a seller, manufacturer, or person that provides the device 110. The device provider 130 includes a device provider authentication unit 132, a second storage unit 134, and a device authentication processing unit 136.

The device provider authentication unit 132 sends a device provider authentication request message (hereinafter, referred to as a "second authentication request message") to the service provider 150, and receives a device provider authentication response message (hereinafter, referred to as a "second response message") from the service provider 150 in response to the second authentication request message. The second authentication request message may include information on a unique key of a device provider, information on authentication to process a device provider authentication request, and/or information on a time at which the device provider authentication is requested. If the second response message includes authentication information about the device provider 130, the device provider authentication unit 132 extracts the authentication information from the second response message and stores the extracted information in the second storage unit 134. Here, the authentication information may include an ID and password provided by the service provider 150.

If the first authentication request message is received from the device 110, the device authentication processing unit 136 processes an authentication of the device 110, and transmits the first response message indicating a result of the authentication processing to the device 110. In more detail, if the authentication of the device 110 is successfully performed, the success message containing the device authentication information is transmitted to the device 110. Conversely, if the authentication of the device 110 fails, the failure message including the information on one or more causes for the authentication failure may be transmitted to the device 110. However, it is understood that aspects of the present invention are not limited thereto. For example, according to other aspects, if the authentication fails, no message may be transmitted to the device 110, or a failure message without information on causes for the failure may be transmitted.

The service provider 150 provides various services to the device 110 on the network. The service provider 150 includes a device provider authentication processing unit 152, a service authentication processing unit 154, and a service providing unit 156.

The device provider authentication processing unit 152 processes an authentication for the device provider 130 in response to the second authentication request message from the device provider 130, and transmits the second response message including a result of the authentication processing to the device provider 130. Specifically, if the authentication for the device provider 130 is successfully processed, the second response message may include authentication information about the device provider 130.

The service authentication processing unit 154 processes a service authentication in response to the service authentication request message from the device 110, and transmits a service authentication response message including a result of the service authentication processing to the device 110. In more detail, the service authentication request message includes authentication information about the device 110 (i.e., the device authentication information stored in the first storage unit 114). Accordingly, the service authentication processing unit 154 determines whether the device 110 requesting the service authentication is available based on the authentication information about the device 110. If the service authentication processing unit 154 determines that the device 110 is available, the service authentication processing unit 154 may transmit to the device 110 a service authentication response message including an authentication key of a service able to be used by the device 110. However, if the service authentication processing unit 154 determines that the device 110 is not available (i.e., if authentication for the device 110 fails), the service authentication processing unit 154 may transmit to the device 110 a service authentication response message including information on causes for the authentication failure. However, it is understood that aspects of the present invention are not limited thereto. For example, according to other aspects, if the authentication fails, no message may be transmitted to the device 110, or a failure message without information on causes for the failure may be transmitted.

The service providing unit 156 provides a service in response to a service request message from the device 110.

According to aspects of the present invention, the device provider 130 operates as an intermediary device to perform authentication between a plurality of devices 110 and the service provider 150, as described above. Accordingly, authentication is performed between the plurality of devices 110 and the service provider 150 using service authentication information transmitted from the service provider 150 to the device provider 130. That is, according to aspects of the present invention, the service provider 150 sends the service authentication information to the device provider 130, rather than to the plurality of devices 110, so it is possible for the plurality of devices 110 to use services provided by the service provider 150 using the service authentication information through the device provider 130.

For example, if device authentication is performed between a plurality of devices 110 and a single service provider 150, the plurality of devices communicate with a device provider 130 instead of the service provider 150. Accordingly, the service provider 150 does not provide device authentication information to each of the plurality of devices 110 individually, which improves a convenience of the service provider 150. Additionally, if device authentication is performed between a single device 110 and a plurality of service providers 150, the device 110 performs the device authentication with the device provider 130. Accordingly, a user of the device 110 does not individually perform a device authentication with each of the plurality of service providers 150, so it is possible to enhance a user convenience.

Figure 2:
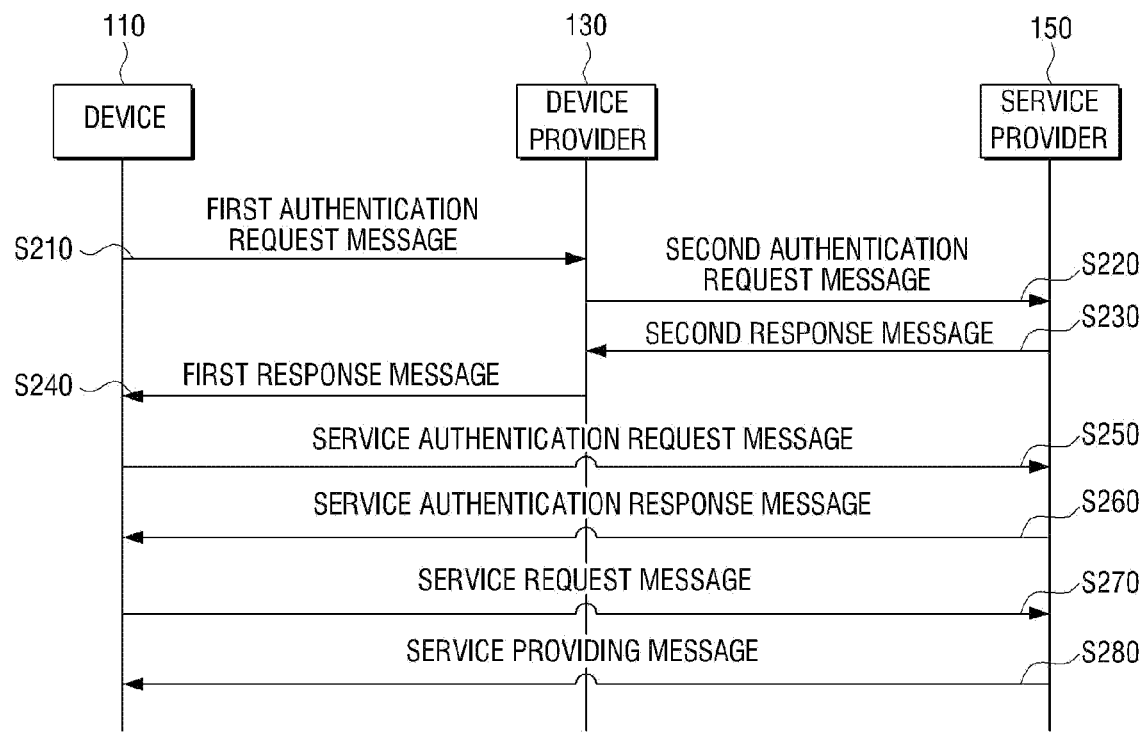
FIG. 2 is a flowchart explaining a process by which the system shown in FIG. 1 performs a device authentication and service authentication, according to an embodiment of the present invention.

FIG. 2 is a flowchart explaining a process by which the system shown in FIG. 1 performs a device authentication and service authentication, according to an embodiment of the present invention. Referring to FIG. 2, the device 110 sends the first authentication request message to request authentication information on the device 110 to the device provider 130 in operation S210. The first authentication request message may include information on a serial key of the device 110 (or other unique identification information), information on a device authentication to process a device authentication request, and/or information on a time at which device authentication is requested, as described above.

In response to the first authentication request message from the device 110, the device provider 130 transmits the second authentication request message to request authentication information about the device provider 130 to the service provider 150 in operation S220. The second authentication request message may include information on a unique key of the device provider 130 (or other unique identification information), information on authentication to process a device provider authentication request, and/or information on a time at which device provider authentication is requested, as described above.

In response to the second authentication request message from the device provider 130, the service provider 150 performs an authentication of the device provider 130. In response to the authentication being successfully performed, the service provider 150 transmits the second response message including authentication information about the device provider 130 to the device provider 130 in operation S230. The authentication information may include an ID and/or password provided by the service provider 150.

The device provider 130 transmits, to the device 110, the first response message including the authentication information received from the service provider 150 in operation S240. Since the device 110 then communicates with the device provider 130 to perform device authentication according to aspects of the present invention, it is possible to simplify a device authentication process.

Subsequently, in order to receive a predetermined service, the device 110 transmits a service authentication request message to use the service to the service provider 150 using the device authentication information in operation S250. The service authentication request message may include the device authentication information, information on service authentication to process a service authentication request, and/or information on a time at which service authentication is requested, as described above.

The service provider 150 performs a service authentication in response to the service authentication request message, and transmits a service authentication response message to the device 110 in operation S260. In more detail, in response to the service authentication being successfully performed, the service provider 150 may transmit a service authentication response message including service authentication information to the device 110. Conversely, in response to the service authentication failing, the service provider 150 may transmit a service authentication response message including information on causes for authentication failure to the device 110. Here, the service authentication information may include information regarding an authentication key provided by the service provider 150.

The device 110 transmits, to the service provider 150, a service request message to request a predetermined service using the service authentication information in operation S270. The service provider 150, in response to the service request message, transmits a service providing message to provide the predetermined service to the device 110 in operation S280.

While the device provider 130 transmits the second authentication request message to the service provider 150 in response to receiving the first authentication request message from the device 110 in the above-described embodiment of the present invention, it is understood that aspects of the present invention are not limited thereto. For example, according to other aspects, the device provider 130 transmits an authentication request message to the service provider 150 even if the first authentication request message is not received from the device 110. In this situation, if a response message notifying that authentication has succeeded is received from the service provider 150, the device provider 130 may store authentication information included in the response message. Moreover, if an authentication request message is received from the device 110, the device provider 130 may transmit the stored authentication information to the device 110.

Figure 3:
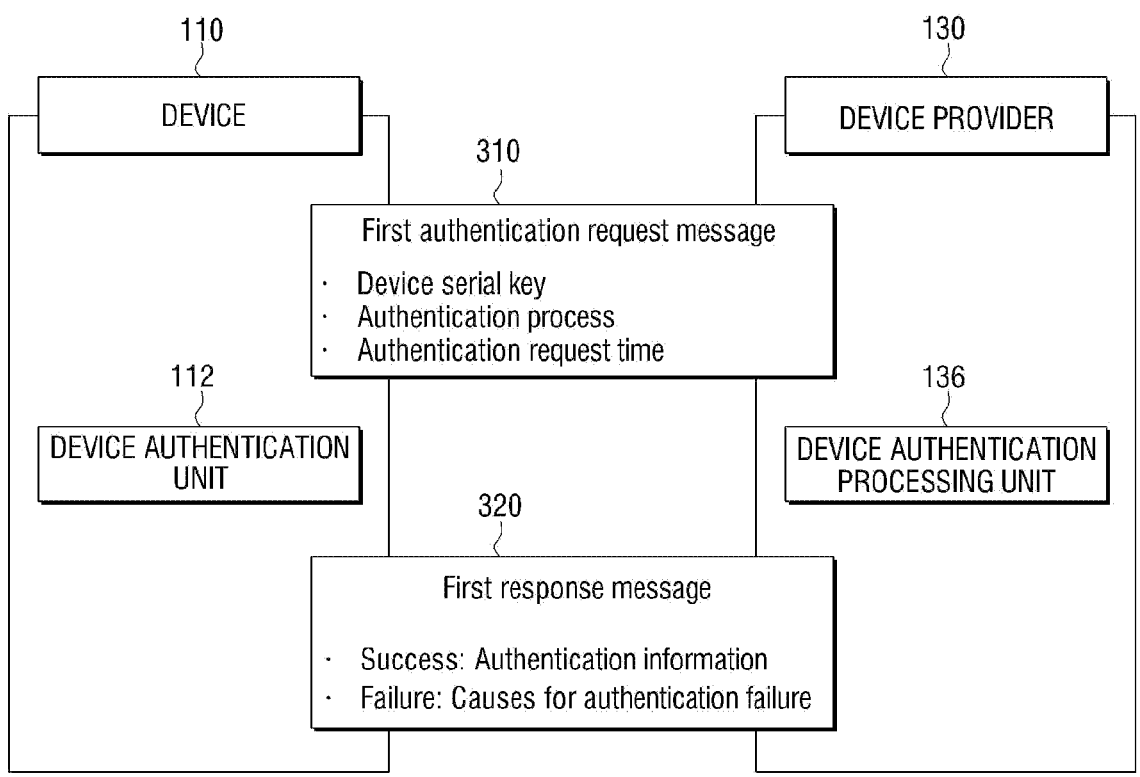
FIG. 3 illustrates a device authentication process between a device and a device provider according to an embodiment of the present invention.

FIG. 3 illustrates a device authentication process between the device 110 and the device provider 130 according to an embodiment of the present invention. Referring to FIG. 3, in response to the device authentication unit 112 of the device 110 transmitting a first authentication request message 310 to the device provider 130, the device provider 130 transmits a first response message 320 to the device 110. The first authentication request message 310 may include information on a serial key of the device 110 (or other unique identification information of the device 110), information on device authentication to process a device authentication request, and/or information on a time at which device authentication is requested, as described above. Additionally, in response to the authentication being successfully performed, the authentication information may be include in the first response message 320. Conversely, in response to the authentication failing, information on causes of authentication failure may be included in the first response message 320. Additionally, the device provider 130 may store information regarding the device 110, so that it is possible to recognize the device 110 by receiving only a serial key (or other unique identification information) of the device 110.

If a plurality of service providers 150 exist, the device provider 130 may receive authentication information from each of the plurality of service providers 150 and may store the received authentication information. The device provider 130 may transmit the authentication information to the device 110 when the device 110 requests device authentication, so that there is no need for the device 110 to perform device authentication with each of the plurality of service providers 150.

Figure 4:
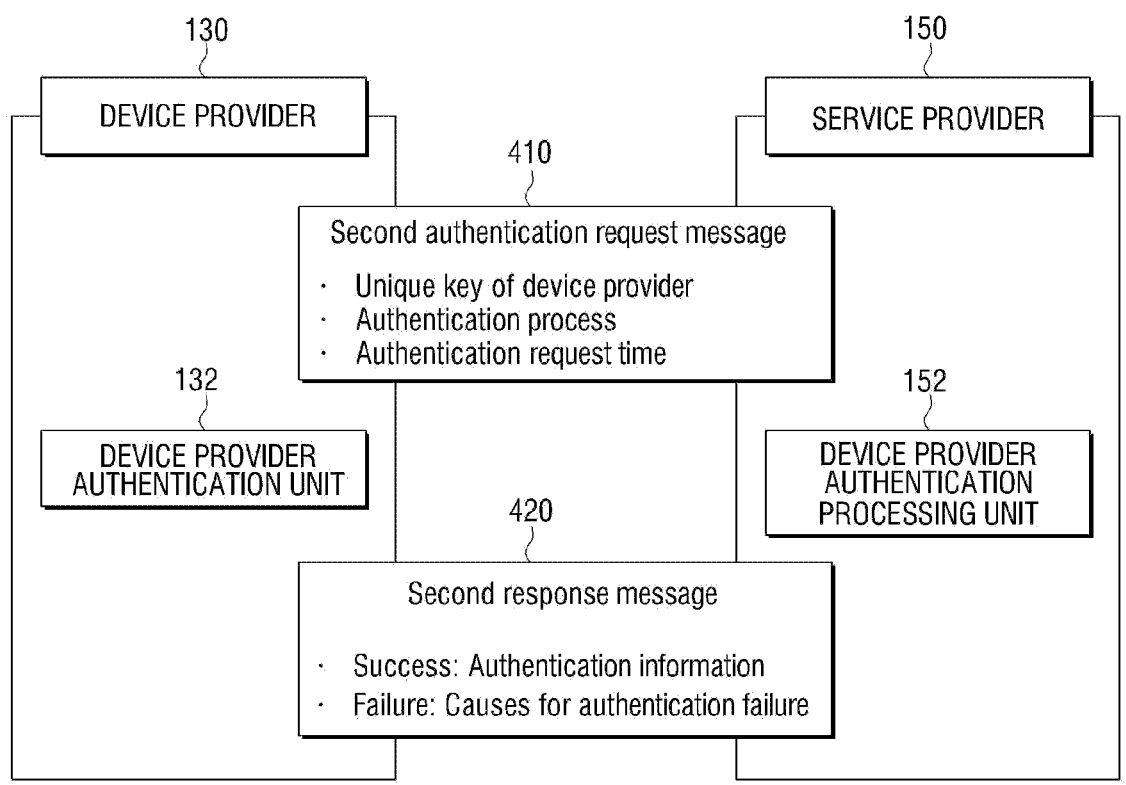
FIG. 4 illustrates a device provider authentication process between a device provider and a service provider according to an embodiment of the present invention.

FIG. 4 illustrates a device provider authentication process between the device provider 130 and the service provider 150 according to an embodiment of the present invention. Referring to FIG. 4, the device provider authentication unit 132 of the device provider 130 transmits a second authentication request message 410 to the service provider 150. Accordingly, the device provider authentication processing unit 152 of the service provider 150 transmits a second response message 420 to the device provider 130 in response to the second authentication request message 410. Here, the second authentication request message 410 may include information on a unique key of the device provider 130 (or other unique identification information), information on authentication to process a device provider authentication request, and/or information on a time at which device provider authentication is requested, as described above. In response to the device provider authentication being successfully performed, authentication information about the device provider 130 may be included in the second response message 420. In contrast, in response to the device provider authentication failing, information on causes of authentication failure may be included in the second response message 420.

Accordingly, a device provider 130 may be authenticated instead of a plurality of devices 110, and authentication information may be provided by the device provider 130 to each of the plurality of devices 110. Therefore, a service provider 150 does not perform device authentication for each of the plurality of devices 110, so the authentication process may be simplified.

Figure 5:
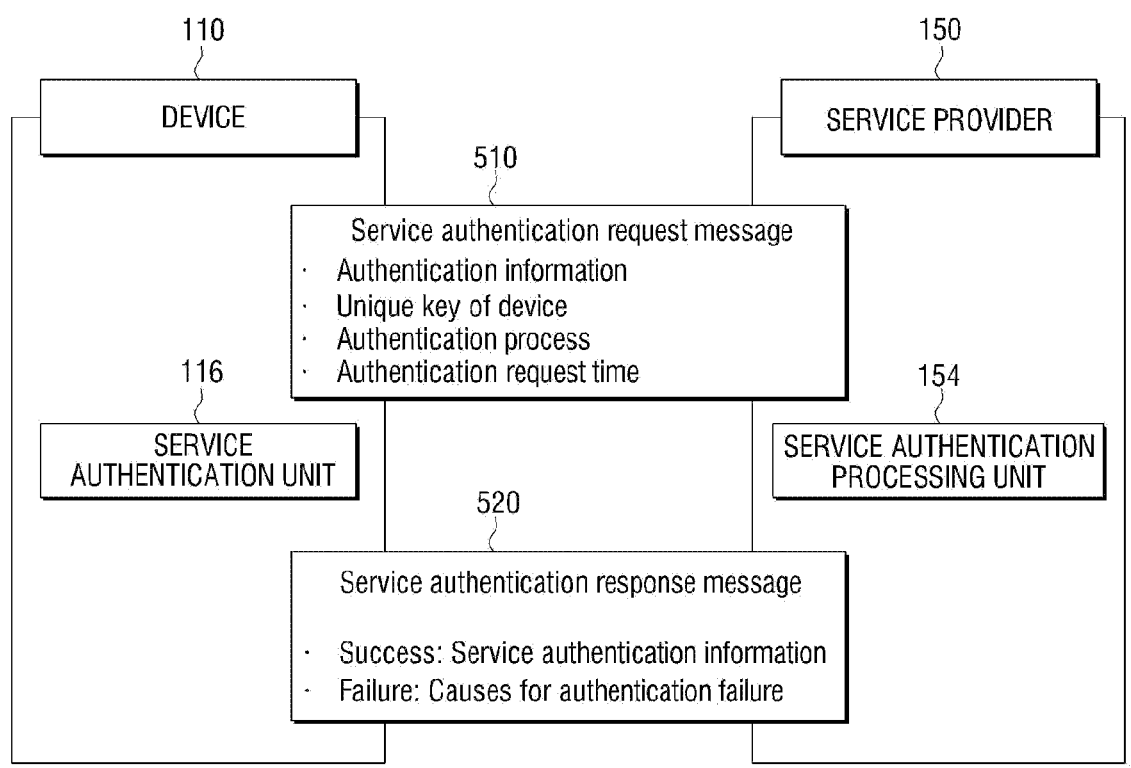
FIG. 5 illustrates a service authentication process between a device and a service provider according to an embodiment of the present invention.

FIG. 5 illustrates a service authentication process between the device 110 and the service provider 150 according to an embodiment of the present invention. Referring to FIG. 5, in response to the service authentication unit 116 of the device 110 transmitting a service authentication request message 510 to the service provider 150, the service authentication processing unit 154 of the service provider 150 transmits a service authentication response message 520 to the device 110. The service authentication request message 510 may include device authentication information, information on service authentication to process a service authentication request, and/or information on a time at which service authentication is requested, as described above. In response to the service authentication being successfully performed, the service authentication information may be included in the service authentication response message 520. Conversely, in response to the service authentication failing, information on causes of authentication failure may be included in the service authentication response message 520.

After the service authentication has finished as described above, the device 110 may receive a service from a service provider 150. In other words, the device 110 may be provided with services through the service authentication with the service provider 150, so that it is possible to simplify a process by which the device 110 receives services.

As described above, according to aspects of the present invention, a device provider 130 is used to simplify device authentication between a device 110 and a service provider 150. The device provider 130 may be a computer or server of a person, seller, or manufacturer that provides a device, but aspects of the present invention are not limited thereto. For example, according to other aspects, the device provider 130 may be any server having information regarding the device 110. Furthermore, while authentication is described as being performed for a device 110 and/or device provider 130, it is understood that the authentication may also be performed for a user (for example, from among a plurality of users) of the device 110 and/or device provider 130.

While not restricted thereto, aspects of the present invention can also be embodied as computer-readable code on a non-transitory computer-readable recording medium. The non-transitory computer-readable recording medium is any data storage device that can store data that can be thereafter read by a computer system. Examples of the non-transitory computer-readable recording medium include read-only memory (ROM), random-access memory (RAM), CD-ROMs, magnetic tapes, floppy disks, and optical storage devices. The non-transitory computer readable recording medium can also be distributed over network-coupled computer systems so that the non-transitory computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A device authentication method between a device and each of a plurality of service providers to provide a service to the device respectively, the authentication method comprising:
   requesting, by the device, a device authentication information to a device provider, the device authentication information authenticating the device as being authorized to receive the service from each of the plurality of service providers, the plurality of service providers being different from the device provider;
   receiving, by the device, the device authentication information from the device provider;
   transmitting, by the device, a service authentication request message comprising the device authentication information directly to a service provider of the plurality of service providers;
   receiving, by the device, a service authentication response message from the service provider confirming authentication of the device;
   transmitting, by the device, a service request message directly to the service provider; and
   receiving, by the device, the requested service from the service provider.

2. The authentication method as claimed in claim 1, wherein the requesting of the device authentication information comprises transmitting, to the device provider, a message including information on a unique key of the device, information on an authentication process, and/or information on a time at which the device authentication information is requested.

3. The authentication method as claimed in claim 1, further comprising:
   requesting, by the device, a service authentication information from each of the plurality of service providers using the received device authentication information; and
   receiving the service authentication information from each of the plurality of service providers.

4. The authentication method as claimed in claim 1, wherein the device authentication information comprises an identification (ID) and/or a password provided by each of the plurality of service providers for device authentication.

5. A non-transitory computer-readable recording medium encoded with the method of claim 1 and implemented by at least one computer.

6. An authentication method of a device provider to authenticate a plurality of external devices receiving a service from each of a plurality of service providers respectively, the authentication method comprising:
   receiving, by the device provider, a first authentication request message from an external device of the plurality of external devices;
   transmitting, by the device provider, a second authentication request message requesting a device authentication information to at least one of the plurality of service providers;
   receiving, by the device provider, the device authentication information from the at least one of the plurality of service providers in response to the second authentication request message; and
   transmitting, by the device provider, the received device authentication information to the external device,
   wherein the device authentication information is used by each of the plurality of external devices to obtain the service directly from each of the plurality of service providers without the service providers additionally authenticating each external device when each external device requests the service directly from each of the plurality of service providers, and
   wherein the device authentication information is stored at the device provider and is reusable to obtain the service.

7. The authentication method as claimed in claim 6, wherein the requesting of the device authentication information comprises transmitting, to each of the plurality of service providers, a message comprising information on a unique key of the external device, information on an authentication process, and/or information on a time at which the device authentication information is requested.

8. The authentication method as claimed in claim 6, wherein the device authentication information comprises an identification (ID) and/or a password provided by each of the plurality of service providers for device authentication.

9. The authentication method as claimed in claim 6, wherein the device provider is connected to the plurality of external devices, such that the device provider receives a plurality of device authentication information from each of the plurality of service providers respectively corresponding to the plurality of external devices.

10. A non-transitory computer-readable recording medium encoded with the method of claim 6 and implemented by at least one computer.

11. A device to perform authentication, the device comprising:
- a device authentication unit to request device authentication information to a device provider, the device authentication information authenticating the device as being authorized to receive a service from each of a plurality of service providers, the plurality of service providers being different from the device provider, and to receive the device authentication information from the device provider;
- a storage unit to store the device authentication information;
- a service authentication unit for requesting a service authentication directly from a service provider of the plurality of service providers, the request for service authentication comprising the device authentication information; and
- a service receiving unit to receive a service requested directly from the service provider.

12. The device as claimed in claim 11, wherein the device authentication unit transmits, to the device provider, a message including information on a unique key of the device, information on an authentication process, and/or information on a time at which the device authentication information is requested.

13. The device as claimed in claim 11, wherein the service authentication unit requests service authentication information from each of the plurality of service providers using the received device authentication information, and receives the service authentication information from each of the plurality of service providers.

14. The device as claimed in claim 13, wherein the device provider receives a plurality of device authentication information respectively corresponding to each of the plurality of service providers.

15. The device as claimed in claim 13, wherein the service authentication unit transmits, to each of the plurality of service providers, a service authentication request message including the device authentication information, information on a unique key of the device, information on a service authentication process, and/or information on a time at which the service authentication information is requested.

16. The device as claimed in claim 11, wherein the device authentication information comprises an identification (ID) and/or a password provided by each of the plurality of service providers for device authentication.

17. A device to authenticate a plurality of external devices receiving a service from each of a plurality of service providers, the device comprising:
- an authentication unit to request a device authentication information from each of the plurality of service providers when a first authentication request message is received from an external device of the plurality of external devices, and to receive the device authentication information from each of the plurality of service providers in response to the request for the device authentication information; and
- an authentication processing unit to transmit the received device authentication information from a device provider to the external device,
- wherein the device authentication information is used by each of the plurality of external devices to obtain the service directly from each of the plurality of service providers without the service providers additionally authenticating each external device when each external device requests the service from each of the plurality of service providers, and
- wherein the device authentication information is stored at the device provider and is reusable to obtain the service.

18. The device as claimed in claim 17, wherein the authentication unit transmits, to the service provider, a message comprising information on a unique key of the external device, information on an authentication process, and/or information on a time at which the device authentication information is requested.

19. The device as claimed in claim 17, wherein the device authentication information comprises an identification (ID) and/or a password provided by each of the plurality of service providers for device authentication.

20. The device as claimed in claim 17, wherein the authentication unit receives a plurality of device authentication information from each of the plurality of service providers respectively corresponding to the plurality of external devices.

* * * * *